May 4, 1971 R. A. FALK 3,577,460
SYNTHESIS OF PERFLUOROISOPROPYLIDENIMINE
Filed Nov. 7, 1968
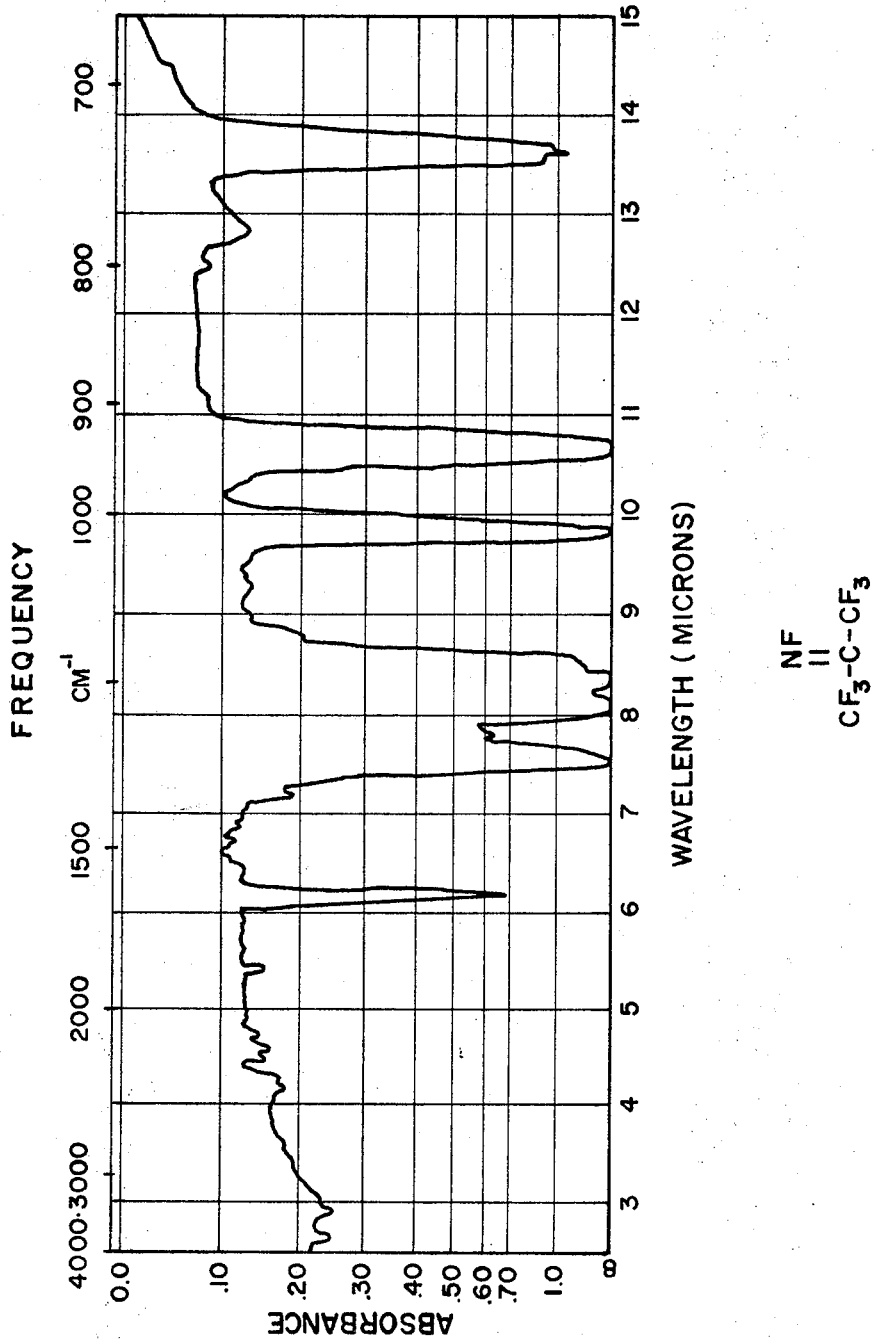
ROBERT A. FALK
INVENTOR.
BY Emil W. Milan
ATTORNEY United States Patent Office 3,577,460
Patented May 4, 1971

3,577,460
SYNTHESIS OF PERFLUOROISOPROPYL-
IDENIMINE
Robert A. Falk, Rockaway, N.J., assignor to Thiokol
Chemical Corporation, Bristol, Pa.
Filed Nov. 7, 1968, Ser. No. 774,161
Int. Cl. C07c 119/00
U.S. Cl. 260—566
6 Claims

ABSTRACT OF THE DISCLOSURE

The compound perfluoroisopropylidenimine, $$(CF_3)_2C=NF$$

is prepared by a novel method comprising treating $$(CF_3)_2CFI$$

with $N_2F_4$ to form $(CF_3)_2CFNF_2$ and defluorinating the latter product with ferrocene to form $(CF_3)_2C=NF$. The compound $(CF_3)_2C=NF$ is useful as a monomer, which form copolymers with tetrafluoroethylene useful in preparing extruded and molded plastic bodies.

BACKGROUND OF THE INVENTION

Field of the invention

The invention relates to the monomer perfluoroisopropylidenimine having the formula $(CF_3)_2C=NF$, and to a method for its preparation.

Description of the Prior Art

A compound speculated to have the probable structure $(CF_3)_2C=NF$ is described by Dresdner et al. in J. Am. Chem. Soc. 82, 5831 (1960). The structure of the compound made by Dresdner et al. was not satisfactorily proved by the authors, and was inconclusively proposed by them to be either $(CF_3)_2C=NF$, or $CF_3CF_2CF=NF$, or $C-(CF_2)_3NF$. No utility was taught by Dresdner et al. for their compound. However, John Ruff in J. Org. Chem., vol. 32, pages 1675-77, 1967, teaches preparation of $(CF_3)_2C=NF$ by catalytic fluorination of $$(CF_3)_2C=NF$$

by catalytic fluorination of $(CF_3)_2C=NH$ and adequately establishes its structure.

SUMMARY OF THE INVENTION

The compound perfluoroisopropylidenimine, $$(CF_3)_2C=NF$$

is prepared by reacting 2-iodoheptafluoropropane with tetrafluorohydrazine in an autoclave at an elevated temperature, e.g. 100–120° C., to form an intermediate compound, 2-difluoroaminoheptafluoropropane, and reacting the latter compound with a slurry of a dicyclopentadienyl metal compound, e.g. ferrocene, to defluorinate the intermediate compound to the product $(CF_3)_2C=NF$ in high yield, e.g. about 90%, in 90–95% purity. The identity of the product as $(CF_3)_2C=NF$ has been established by $F^{19}$ nuclear magnetic resonance spectroscopy, and by its infrared spectrum and mass spectrum.

The invention may be represented by the following set of equations:

(1) $(CF_3)_2CFI + N_2F_4 \xrightarrow{100-120°\,C.} (CF_3)_2CFNF_2 + NF_2$ (2) $(CF_3)_2CFNF_2 \xrightarrow{(C_5H_5)_2M} (CF_3)_2C=NF$ A byproduct, dicyclopentadienyl metal fluoride, is also formed. Its formula is dependent on the valence of the metal ion in the molecule of the compound and will be either a monofluoride or a higher fluoride accordingly.

The product $(CF_3)_2C=NF$ is useful as a monomer and may be copolymerized with another monomer, e.g. tetrafluoroethylene, as more fully disclosed in copending application Ser. No. 774,160, filed Nov. 7, 1968. Copolymer of $(CF_3)_2C=NF$ with tetrafluoroethylene has a predominance of polytetrafluoroethylene structural units. Also, the copolymer retains most of the properties of polytetrafluoroethylene while having the property of melting to a free-flowing fluid instead of sintering to a plastic mass. The copolymer, therefore, can be used for forming extruded and molded plastic bodies, e.g. plastic bottles, wire-coatings, and the like, more readily than can be done with polytetrafluoroethylene, while retaining many of the advantages of the latter material.

The starting material 2-iodoheptafluoropropane is a known material. It may be prepared from perfluoropropene by iodofluorinating with iodomonofluoride. The latter material preferably is prepared by reacting elemental iodine with iodine pentafluoride. The iodofluorination reaction may be represented by the following equation:

$$5CF_3CF=CF_2 + 2I_2 + IF_5 \rightarrow 5(CF_3)_2CFI$$

The dicyclopentadienyl metal compound, $(C_5H_5)_2M$, used in practice of the invention is a compound wherein M is a transition metal. Preferably, M is iron, cobalt, nickel, manganese, titanium, vanadium or chromium and the corresponding preferred compounds are $(C_5H_5)_2Fe$, $(C_5H_5)_2Co$, $(C_5H_5)_2Ni$, $(C_5H_5)_2Mn$, $(C_5H_5)_2Ti$, and $(C_5H_5)_2V$. The preferred transition metals appear in the first row of the Periodic Table and are representative of metals which form organometallic compounds with two hydrocarbon ligands. Such cyclopentadienyl metal compounds are described by H. Zeiss, Organometallic Chemistry, American Chemical Society Monograph Series, Reinhold Publishing Company, New York, chapter 7 (1960), incorporated herein by reference.

Preferably, the dicyclopentadienyl metal compound is dicyclopentadienyl iron, or ferrocene. The dicyclopentadienyl metal compound reacts with the intermediate compound $(CF_3)_2CFNF$ to form a corresponding fluoride of the dicyclopentadienyl metal compound. Thus $$(CF_3)_2CFNF_2$$

reacts with ferrocene, $(C_5H_5)_2Fe$, to form dicyclopentadienyl iron fluoride, $(C_5H_5)_2FeF_{\cdot 2}$.

The reactions in both steps of the process are carried out at temperatures elevated above room temperature, and preferably at 100 C. or higher. For the first step, a temperature between about 100 to 120° C. is preferably used. A higher temperature may be used, but since the reaction involves $N_2F_4$ and is carried out under the pressure of the gaseous reactants in a closed vessel, the lower temperatures are preferably used. The use of safety barricades is generally prescribed for all reactions involving $N_2F_4$ as a reactant. The second step of the action is carried out in an ordinary reaction vessel, also at temperatures of about 100° C. or higher. In either step, somewhat lower temperatures may be used, as will be obvious to one skilled in the art, with a longer reaction time then being necessary. The reaction time for each step is less than 24 hours at 100–120° C. and generally is about 20 hours or less for the first step and about 16 hours or less for the second step. The yield of the intermediate product in the first step, $(CF_3)_2CFNF_2$, is about 36% by weight based on the weight of 2-iodoheptafluoropropane used. The yield of the product $(CF_3)_2C=NF$ in the second step is about 90% based on the $(CF_3)_2CFNF_2$.

BRIEF DESCRIPTION OF THE DRAWING

The drawing shows a tracing of the infrared spectrum for the monomer $(CF_3)_2C=NF$.

DESCRIPTION OF THE PREFERRED EMBODIMENTS

The invention is illustrated by the following detailed description of the preferred method for the preparation of the compound $(CF_3)_2C=NF$.

Example 1

2-iodoheptafluoropropane (14.8 g., 0.05 moles) is condensed into a barricaded steel pressure reactor and thoroughly degassed by freezing and thawing at −196° C. Tetrafluorohydrazine (10.4 g., 0.1 mole) is condensed into the reactor. The reaction mass is heated to 100–120° C. for about 20 hours. Then, the reactor and its contents are cooled to −78°. Unreacted tetrafluorohydrazine is pumped off. The crude product is passed through two successive cold traps held at −78° and −196° C., respectively, at a reduced pressure of 1–20 mm. Hg. The first trap serves to condense unreacted 2-difluoroaminoheptafluoropropane and iodine. The second trap condenses the desired product (4 g., .018 mole, 36% yield) of crude 2 - difluoroaminoheptafluoropropane. A small quantity of 2 - nitrosoheptafluoropropane may be present as impurity.

The crude 2 - difluoroaminoheptafluoropropane is passed into a 2 liter glass laboratory flask containing a slurry (11.2 g., .060 mole) of dicyclopentadienyl iron (ferrocene) and 10 ml. of orthodichlorobenzene. The reaction mass is heated to about 100° C. for about 16 hours. The gaseous product (2.9 g., 0.016 mole, about 90% yield) of perfluoroisopropylidenimine is removed as it forms.

The monomer is obtained in 90–95% purity, as determined by gas-liquid chromatography on 20% SF-96 (silicone fluid oil) on hexamethyldisiloxane treated Chrom P (diatomaceous earth) at −40° C. Pure compound was collected by gas chromatography. Its structural formula of $(CF_3)_2C=NF$ was confirmed by mass spectroscopy and $F^{19}$ nuclear magnetic resonance (n.m.r.) spectroscopy. Table I shows the mass spectrum data obtained for $(CF_3)_2C=NF$.

TABLE 1
[Mass spectrum for $(CF_3)_2C=NF$ (M.W.=183)]

| m/e [1] | Species | Relative intensity |
|---|---|---|
| 183 | $C_3F_7N$ | 2.0 |
| 131 | $C_3F_5$ | 0.6 |
| 114 | $C_2F_4N$ | 0.6 |
| 100 | $C_2F_4$ | 0.7 |
| 95 | $C_2F_3N$ | 1.0 |
| 93 | $C_3F_3$ | 1.5 |
| 76 | $C_2F_2N$ | 4.2 |
| 74 | $C_2F_2$ | 0.8 |
| 69 | $CF_3$ | 90.0 |
| 50 | $CF_2$ | 10.0 |
| 44 | $CO_2$ | 0.7 |
| 38 | $F_2$ | 0.6 |
| 33 | $NF$ | 0.6 |
| 31 | $CF$ | 10.8 |

[1] m/e=mass in atomic units charge on the ion measured in terms of the number of electrons removed or added in the ionization process.

Table II shows the nuclear magnetic resonance spectrum data obtained for $(CF_3)_2C=NF$.

TABLE II
[$F^{19}$ nuclear magnetic resonance spectrum of $(CF_3)_2C=NF$ at 56.4 Mc.]

| Peak$\phi$* | Assignment | Area ratio |
|---|---|---|
| −49.5 broad | N—F | 1 |
| +64.3 two quartets | —$CF_3$ | 2.8 |
| $^JCF_3CF_3$, 6.0 c.p.s. | | |
| $^JCF_3NF$ (trans-26.4 c.p.s.) | | |
| +67.6 multiplet | —$CF_3$ | 2.8 |

$\phi$*=Calibration characteristic.
$^J$=Tabulated intensity.
$F^{19}$=fluorine, atomic weight 19.

It is to be noted that the nuclear magnetic resonance (n.m.r.) peaks at values of −49.5, +64.3 and +67.6 and the area ratios of 1:2.8:2.8 agree with those of Ruff, supra, reported as −48.3, 63.6 and 66.8 with relative area ratios of 3.15:2.95:1. Identity of the compound of the process of this invention as $(CF_3)_2C=NF$ is thus confirmed.

The infrared spectrum of $(CF_3)_2C=NF$ was determined and its chart is shown in the drawing. The infrared bond at 6.1 microns is ascribed to C=NF.

Perfluoroisopropylidenimine, $(CF_3)_2C=NF$, is structurally similar to hexafluoroacetone, $(CF_3)_2C=O$; its photolytic properties therefore were investigated to further confirm the $(CF_3)_2C=NF$ structure. The absorption of the compound in the ultraviolet region was measured. Absorption begins at 334 mμ wavelength with a maximum 273 mμ ($\epsilon \approx 160$), and is minimum at 254 mμ and then increases into the vacuum ultraviolet range, (mμ=millimicrons). The 273 mμ absorption is in the accessible region of a high pressure mercury arc lamp, and a match-up of material absorption and lamp energy can easily be attained.

The perfluoroisopropylidenimine behaves like hexafluoroacetone; its ultraviolet initiated decomposition proceeds as follows:

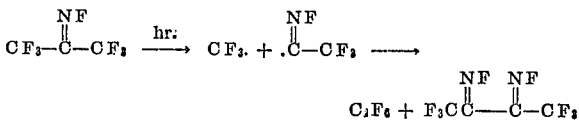

A sample of 50 mm. Hg of perfluoroisopropylidenimine was loaded into a quartz cell having a 10 cm. path length and volume of 32 cc. The sample was irradiated with a 200 watt super pressure mercury arc lamp through two 7–54 filters and its absorption spectra taken at 2, 5, and 7 hours with a DK-2 spectrophotometer. The only significant change in absorption was a maxima shift from 273 mμ to 270 mμ with an increase in absorption at shorter wavelengths. After 7 hours of irradiation a mass spectrometric analysis of the gas showed evidence of $C_2F_6$ fragmentation products.

The compound $(CF_3)_2C=NF$ is useful as a monomer, particularly as a comonomer. While the $(CF_3)_2C=NF$ was not found to homopolymerize readily, it was found to copolymerize with tetrafluoroethylene and to form a copolymer which, although having a predominance of —$C_2F_4$-linkages, has properties which are different from polytetrafluoroethylene. The preparation of such a copolymer is illustrated in the following example.

Example 2

Perfluoroisopropylidenimine (0.33 g., 1.8 mmoles) and tetrafluoroethylene (0.12 g., 1.2 mmoles) were condensed into a 30 ml. stainless steel Hoke cylinder and irradiated in a $Co^{60}$ gamma source (0.4 Mrads/day) to 2.4 Mrads. The residual gas was essentially $(CF_3)_2C=NF$, with no $C_2F_4$ present. The polymeric product was a white powder of Teflon-like appearance, but its infrared spectrum had several bands not present in polytetrafluoroethylene at 7.8, 9.8, 11.2 and 12.8μ, and an exceedingly sharp band at 10.1μ. The radiation-initiated copolymerization was repeated using a 10:1 parts by weight of $(CF_3)_2C=NF$:$CF_2=CF_2$ charge and a radiation dosage of 2.0 Mrads with almost identical results.

The copolymer product from each run softens at 230° C. and melts completely to a clear free-flowing liquid at 270–280° C. By comparison, polytetrafluoroethylene prepared in the same manner as the copolymer sinters at 321–323° C. and does not melt.

The copolymer was examined by differential thermal analysis (DTA) and found to have an endotherm at 260–280° C. By comparison, polytetrafluoroethylene has an endotherm at 320–330° C. and an exotherm at 470–550° C.

The above copolymer was found to contain 1.1% by weight of nitrogen on analysis. The composition thus corresponds to a copolymer containing one perfluoroisopropylidenimine unit to twelve tetrafluoroethylene units, and having a molecular weight of at least about 1400, as follows:

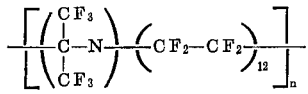

wherein $n$ is an integer of at least 1.

Example 3

The copolymer is placed in a plastic extruder machine fitted with wire-coating dies and is extruded around aluminum wire in the usual way. An electrically conductive wire sheathed in copolymer of perfluoroisopropylidenimine-tetrafluoroethylene is thus prepared. The wire then is used in making electrical connections from a source of alternating current to a light bulb.

The novel $(CF_3)_2C=NF$ of the present invention may be prepared by substituting for the ferrocene used in Example 1 another one or more of the dicyclopentadienyl metal compounds described above or of another transition metal. Also, the intermediate compound, 2-difluoroaminoheptafluoropropane, may be prepared by a method other than that described above, and defluorinated according to the method of the invention. Other modifications and variations of the invention are possible and are intended to be within the scope of the invention as defined by the clams.

I claim:
1. A method for preparing the monomer

comprising reacting 2-difluoroaminoheptafluoropropane with a dicylopentadienyl metal compound represented by the formula $(C_5H_5)_2M$ wherein M is a transition metal at an elevated temperature for a period of time sufficient to form $(CF_3)_2C=NF$.

2. The method of claim 2 comprising first reacting 2-iodoheptafluoropropane with tetrafluorohydrazine at an elevated temperature for a period of time sufficient to form said 2-difluoroaminoheptafluoropropane.

3. The method of claim 1 wherein the reaction is carried out at a temperature from about 100 to about 120° C.

4. The method of claim 2 wherein both reactions are carried out at a temperature from about 100 to about 120° C.

5. The method of claim 1 wherein M is a transition metal selected from the group consisting of iron, cobalt, nickel, manganese, titanium, vanadium and chromium.

6. The method of claim 1 wherein M is iron.

References Cited
UNITED STATES PATENTS

| | | | |
|---|---|---|---|
| 3,137,728 | 6/1964 | Reid | 260—566 |
| 3,399,234 | 8/1968 | Zollinger | 260—566 |

LEON ZITVER, Primary Examiner

G. A. SCHWARTZ, Assistant Examiner

U.S. Cl. X.R.

117—232; 260—92.1, 583GG, 647, 653